United States Patent [19]

Powell

[11] 4,320,387
[45] Mar. 16, 1982

[54] INFORMATION COMMUNICATING APPARATUS AND METHOD

[76] Inventor: William S. Powell, Rte. 2, Box 203A, Thornville, Ohio 43076

[21] Appl. No.: 105,403

[22] Filed: Dec. 19, 1979

Related U.S. Application Data

[63] Continuation-in-part of Ser. No. 974,054, Dec. 28, 1978, abandoned.

[51] Int. Cl.³ .................. H04M 11/00; H04Q 5/00
[52] U.S. Cl. ........................ 340/825.34; 179/2 DP
[58] Field of Search ................ 340/149 R; 179/2 DP

[56] References Cited

U.S. PATENT DOCUMENTS

| | | | |
|---|---|---|---|
| 3,932,709 | 1/1976 | Hoff | 179/2 DP |
| 4,068,095 | 1/1978 | Ghormley | 179/2 DP |
| 4,130,738 | 12/1978 | Sandstedt | 179/2 DP |

*Primary Examiner*—Harold I. Pitts
*Attorney, Agent, or Firm*—Robert E. Stebens

[57] ABSTRACT

Apparatus and method is provided for secured communication of information as in effecting financial transactions between two individuals. Apparatus is provided in the form of units personal to respective individuals and including display of information to be communicated, electronic circuit means providing automatic security of transmission between relatively remote units that are intended to be included in a specific transfer of information, electronic information storage means for recording of communicated information, and radiant energy signal transmitting devices for effecting coupling of any two selected apparatus units that are to participate in the information transfer. Time-base controlled signal encoding is utilized to effect generation of the communication to the two selected units. In the method of this invention, each of two selected units are operated to generate the same information signal of an agreed information transfer and a security identification signal which is associated with the respective unit. Transfer of information is effected in sequence with each unit transmitting its information signal and security identification signal in encoded form to the other unit. Each unit compares the received transmission with its information signal and, if it compares, continues its signals to the other unit. Correct comparison in both units then effects termination of the information communication.

11 Claims, 5 Drawing Figures

INFORMATION COMMUNICATING APPARATUS AND METHOD

This is a continuation-in-part application of Ser. No. 974,054, filed Dec. 28, 1978 for INFORMATION COMMUNICATING APPARATUS AND METHOD by William S. Powell, now abandoned.

FIELD OF THE INVENTION

This invention is related to the communication of information as between two specific selected apparatus units. More specifically, the invention is directed to apparatus and method for effecting commercial financial transactions through electronic devices of a highly portable nature and particularly adapted for utilization by individual persons.

Electronic apparatus is known for utilization by financial institutions such as banks for effecting the automated machine transfer and recording of funds and associated transactions. Those machines are the type which are installed in a fixed location, usually associated in close physical proximity to a financial institution such as a bank and are designed to be accessed by individual customers through means of individual identification cards which carry coded identification for the particular customer. Apparatus of this type is necessarily limited in its useful convenience as to individuals because it requires use of the financial institution as interface as between any two persons who are not constituting a party of the bank in the transaction.

In particular, this invention is directed to apparatus and method which enables any two individuals provided with the appropriate apparatus and knowledge of the technique of operation to exchange and transfer monetary funds in the form of electronically recorded transactions. The apparatus and method of this invention performs a direct substitute for the common mechanical and physical transfer of the legally acceptable physical money that may be authorized by the controlling governmental organization.

In a more broad sense and field of wider application, the apparatus and method of this invention is designed to effect a transfer of information which, while more conveniently in the form of a numerical designation, is deemed to comprise the more broad meaning of the term "Communicated Information". Numerical monetary units are a convenient means of illustration of the adaptability of this invention, but it is contemplated that the invention may also be equally adapted and conveniently utilized with extreme versatility in the communicating of information pertaining to other factors or standards of comparison. In an initial primary field of utilization, however, the apparatus and method of this invention will be functioning in the more readily illustratable examples of monetary transfers which basically include a transfer of money in the accepted monetary units from one party to the other and which monetary amounts constitute fungible information elements in a monetary transaction.

SUMMARY OF THE INVENTION

An information communicating apparatus constructed in accordance with this invention for performance of the inventive method is conveniently embodied in a physical apparatus such as a unit similar in exterior appearance to the well-known wristwatch. Since the apparatus is constructed advantageously with solid-state electronic components that have an extremely low power consumption and can thus be energized and operated by miniaturized electrical storage battery devices, it is particularly convenient to fabricate and construct an apparatus of this invention utilizing state of the art technology in this field.

Each apparatus unit embodying this invention, as indicated, may be conveniently incorporated in a physical housing resembling, and of the size of, a customary wristwatch. While the specific invention is directed to the providing of a communicative apparatus to perform the functions of this invention, it will also be understood that the solid-state technology permitting miniaturization of electronic circuitry capable of effecting the desired and intended functions results in a physical component structural arrangement, configuration and size such that the physical housing may also incorporate and include electronically operated conventional time and date devices. Preferably, a combined unit may include a single visual display which can be selectively utilized for either a time display mode or an information communication mode of operation.

The apparatus of each unit basically comprises, for the information communication mode, an electrical power source for generating a transmittable signal as between two apparatus units, which signal comprises both an information component and an identifier component for accessing the other apparatus unit, a transducer for effecting a communicative link between any two selected apparatus units desiring communication therebetween and an electronically secured communication record storage means. The signal input mechanisms of an apparatus unit are preferably manually actuable and perform the functions of selectively forming discrete signals of an electrical nature which are capable of transmission in a communicative link with another apparatus unit and are effective in operating the display unit to visually reference the particular input signal as to both its identifier component and information component.

Communication in the illustrative embodiment may be of the acoustical type wherein either direct short range communication links may be established or other long lines type of electrical transmission systems may be utilized to couple two relatively remote units. Regardless of the particular means of effecting the ultimate communication link, the apparatus is capable of resulting in establishment of a proper communication link as between one individual's apparatus unit and a similar, but specifically distinguishable, unit of another party.

Electronically secured recording of communications is effected by a storage means controlled by a time controlled logic circuit. This logic circuit is of a design which is of a continuously changing type such that only units which have been initially correlated to the same time base are compatible in effecting a transfer of communicated information and having that information recorded in the storage means of any two apparatus units that have an established communication link.

Utilization of the apparatus thus provided by this invention enables any two individuals provided with the compatible units as to the time controlled logic circuitry to effect a transfer of information as between their two respective apparatus units. The two individual parties establish a communication link through entry of appropriate identifier signals in their respective units to form the communication link which is maintained throughout the period of communication necessary to establish the information transfer and to then terminate that transfer by the recording of information in respective storage means. This technique of operation is basically performed by initiation of communication between the two individual parties and concluded by the generation of a transmitted communication signal having an identifier signal component to initiate reception at the other apparatus and providing of an informational signal to be communicated as between the two apparatus units. A communication link is established and maintained between two apparatus units of two different individuals generating respective identifier signals to be transmitted from each to an input of the other apparatus unit. Once this has been accomplished, a communication link is established and is then maintained by the apparatus to effect confirmation of an information transfer previously agreed to by the individuals having control of the two respective apparatus units and transmission of the information desired to be communicated. Once an approval for the information to be transmitted has been established, then the systems of each apparatus automatically continue to operate to activate the recording of the communication as in accordance with the time-controlled logic circuit establishing the integrity of the transaction as between any two apparatus units.

An exemplary apparatus unit embodying this invention includes a visual display that permits the operator of a particular unit to visually verify input of the information which two individuals have agreed to transfer between their respective units. A manually operated switching mechanism provides the necessary means for input of an electrical signal into a system which processes the signals to operate visual displays, recording into electronic memory units and for processing in a logic circuit providing security for each transaction. The logic circuit provides the time control for security functions as to each transaction, comparison of signals received from another unit with the signals input into the unit itself and generation of electrical signals for transmission between units. Electroacoustical transducer means is interconnected with the system for effecting the communicative link as between any two units.

The apparatus and method provided thus enables any two individuals equipped with the apparatus units and knowledge of the technique of operation to effect an electronic transfer and storage of information as between their respective apparatus units. This invention thus enables the individuals to maintain an electronic record of financial transactions in the case of monetary information transfers and, in effect, is a personal credit system which eliminates the physical transfer of conventional monetary units. Within the limit capacity of any particular apparatus, it provides an electronic record of transfers which can be selectively retrieved as desired to generate physical hard copy records as may be required by any ancillary control criteria. Also, if necessary, additional controls can be incorporated to substantially reduce the effect of physical loss of a particular unit and the unauthorized use thereof by any other party. In effect, since a particular unit is for a particular person there is nearly absolute control where transfers are effected for consideration of physical goods. Since it is necessary to establish a communicative link as between any two particular units, the fact that a particular unit has been obtained and may be subject to unauthorized use by another party than to which it is officially issued, can be readily recorded and transmitted to other individuals having the same apparatus unit control and thereby essentially eliminate unauthorized use of the units.

These and other objects and advantages of this invention will be readily apparent from the following detailed description of an illustrative embodiment thereof as shown in the accompanying drawings and the description of the method of performing the invention.

DESCRIPTION OF THE DRAWING FIGURES

DESCRIPTION OF THE ILLUSTRATIVE EMBODIMENT OF THE INVENTION AND METHOD OF INFORMATION COMMUNICATION

Figure 1:
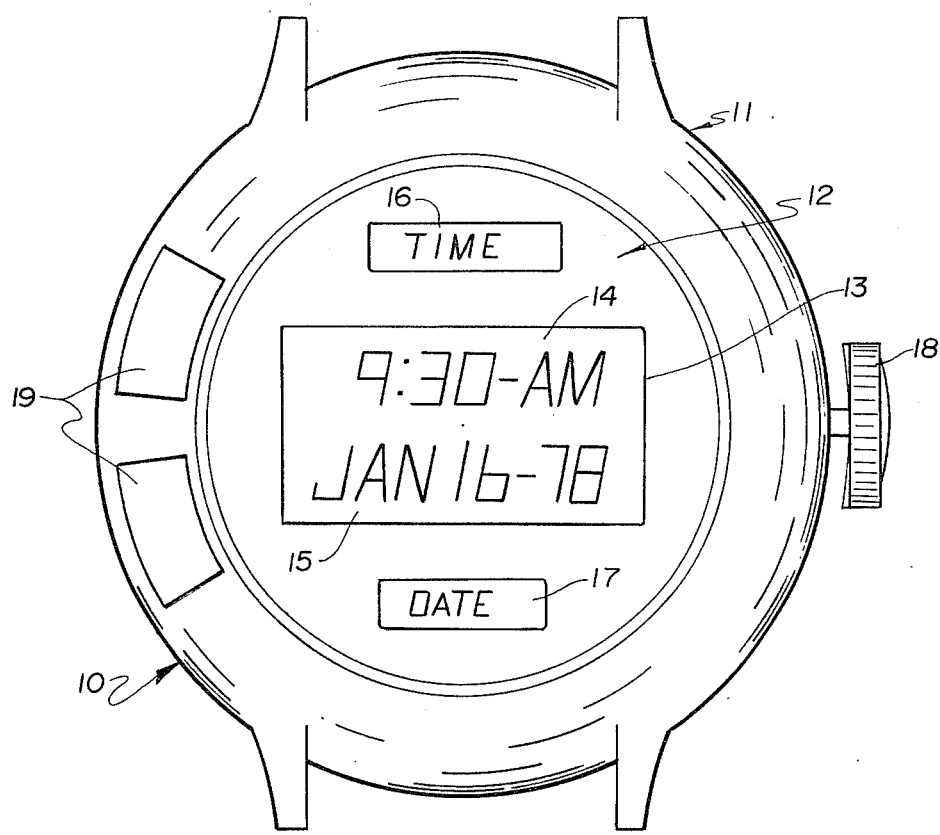
FIG. 1 is a diagrammatic representation in plan view of an apparatus unit embodying this invention.

Having reference to the drawings and specifically to the FIG. 1 thereof, an apparatus unit designated generally by the numeral 10 is shown as embodied in a physical housing substantially similar to that of the conventionally sized wristwatch. This unit includes a structural housing 11 that is circularly configured to resemble the conventional watch and has a finite thickness sufficient to form a interior cavity adequate for the support and maintenance of the electrical components therein. Also associated with the housing 11 is a display panel 12 which is illustrated in FIG. 1 as being of the digital display type for a time and date display. This display panel includes a central viewing window 13 which discloses a plurality of solid state devices such as a light emitting diode (L.E.D.) or a liquid crystal display (L.C.D.) as may be deemed appropriate for energization and powering from a miniturized direct current power supply, such as the wafer type storage battery. The storage battery itself is not illustrated in the drawings other than schematically but would be incorporated and supported in the housing 11. The plurality of display elements encompassed by the viewing window 13 are preferably arranged on two lines disposed in parallel relationship and thus adapted to provide simultaneous display of two information elements such as both a time and a date indication. The display elements themselves are generally indicated as a plurality of components 14 arranged in a linear array disposed above a similar linear array of a plurality of additional display elements 15.

In accordance with this invention where a preferred embodiment of the device includes both time and date functions that are alternatively displayed with reference to the desired communication function, suitable indicia are also provided for indicating which mode of operation is currently employed as shown in FIG. 1. This mode indication includes the separate word designations of 16 and 17, time and date that appear in respective display windows located above and below the central viewing window 13. In this embodiment, since the alternative mode of operation is that of communication of information as to a financial transaction, reference will be had to FIGS. 2 and 3 to note the alternative designations that appear in the mode indication windows 16 and 17. Exemplary of the mode indication for communication information is the lower window indicating that it is a cash transaction with the upper window of each respective apparatus unit indicating the direction of the transfer as being payment from the unit shown in FIG. 2 and an indication that the unit shown in FIG. 3 is the receiver of that transfer. Transactions other than cash are also contemplated with respect to finance and these other contemplated transactions include credit-type functions, either with or without deferred payment, as well as other related transactions. Accordingly, additional appropriate terminology can be selected for alternative display in the mode indications windows 16 and 17 in correspondence with the selected operating mode. It will also be noted in FIGS. 2 and 3 that the central viewing window 13 also illustrates an exemplary display of the information associated with the parties and numerical amount for the particular instance of transfer of a financial transaction which is the primary intended function of the information communication system of this invention.

Suitable means is also provided with the apparatus to control and set functions in either mode of operation of the display unit. Specifically, control is provided by a conventional hand set knob 18 which is mounted on and projects exteriorly from the side of the structural housing 11. This control and set knob is selectively operable either by internal mechanisms associated with the single knob or by auxiliary button selectors (not shown) to perform a setting function as to either the time and date or to effect a proper entry and display of the information to be communicated by the system.

Figure 2:
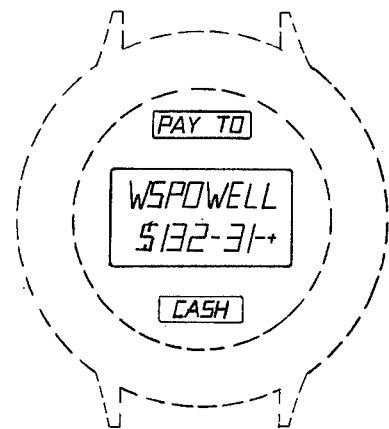
FIG. 2 is a diagrammatic illustration of the apparatus unit wherein the display section thereof is functioning in an information communication mode.
Figure 3:
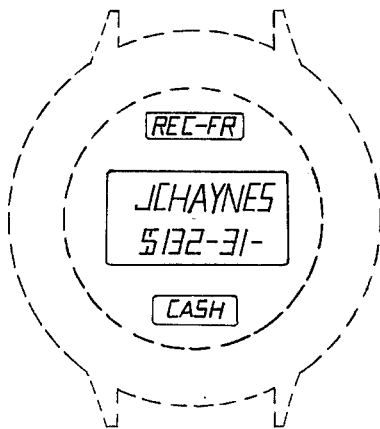
FIG. 3 is a similar diagrammatic plan view of a second apparatus unit illustrating the display in an information communication mode with reference to the apparatus unit of FIG. 2.

Effecting of the communication linkage between any two apparatus units of this invention such as those illustrated in FIGS. 2 and 3 is preferably contemplated as incorporating a radiation transmission type of communication link. Specifically, the units are ideally adpated to incorporate accoustical transducer elements which are uniquely capable of providing the desired direct communication link as between two proximately located apparatus units within the transmission range capability of the apparatus. This enables any two apparatus units to function in cooperation as a consequence of the control operation thereof to effect transfer of the communication signals as between those two units. While direct accoustical coupling is contemplated in the primary instance between any two units, it will also be understood that communication links may be established as between any two units that are separated by a distance greater than that which can be accommodated by the power limits of a particular accoustical transducer through the use of long lines type of communication systems that may comprise either telephones or radio links. Use of a telephone system may require use of auxiliary frequency coupling devices since the telephone systems subscriber terminals are designed for voice frequencies whereas the apparatus of this invention is preferably designed for the ultrasonic frequency range. Utilization of the accoustical transducer of a particular unit with a radio system is clearly apparent as effecting operation in substantially the same manner as any two units that are within direct communication range. However, utilization of appropriate coupling devices may be necessary to establish a radio link with the acoustical signals being used to modulate an appropriate radio frequency signal capable of transmission over non-wired systems. Referring to FIG. 1, it will be noted that the housing 11 is provided with an exteriorally communicating accoustical transducer element 19. This element 19 may be mounted in the housing wall and is thus in a position for effective radiation or reception of accoustical energy. It is also contemplated that optical transmission systems may be used such as systems which operate in the infra-red frequency spectrum.

While it is noted that the preferred embodiment of the apparatus may be conveniently constructed to incorporate the dual mode functions of both time and date and, alternatively, the information communication system, the specifics of the time, date function are not illustrated in the drawings or otherwise described. Those components are well known in the field and it will suffice to note that the same handset control knob 18 is selectively mechanically coupled to effect a control as to the particular selected operating mode. Accordingly, having noted the preferred construction with such dual modes of operations, and noting that the time and date mode is known and does not form a distinct aspect of this invention, the description will now proceed to a detailed description of the electronic circuitry and components associated with the information communication mode of operation. For this purpose, reference will be had to FIGS. 2 and 3 and FIG. 4 which illustrates that portion of the apparatus in block diagram form and which is particularly adapted to provide a functional disclosure of the apparatus. FIG. 5 shows a more specific circuit diagram of an exemplary embodiment of the apparatus.

Figure 4:
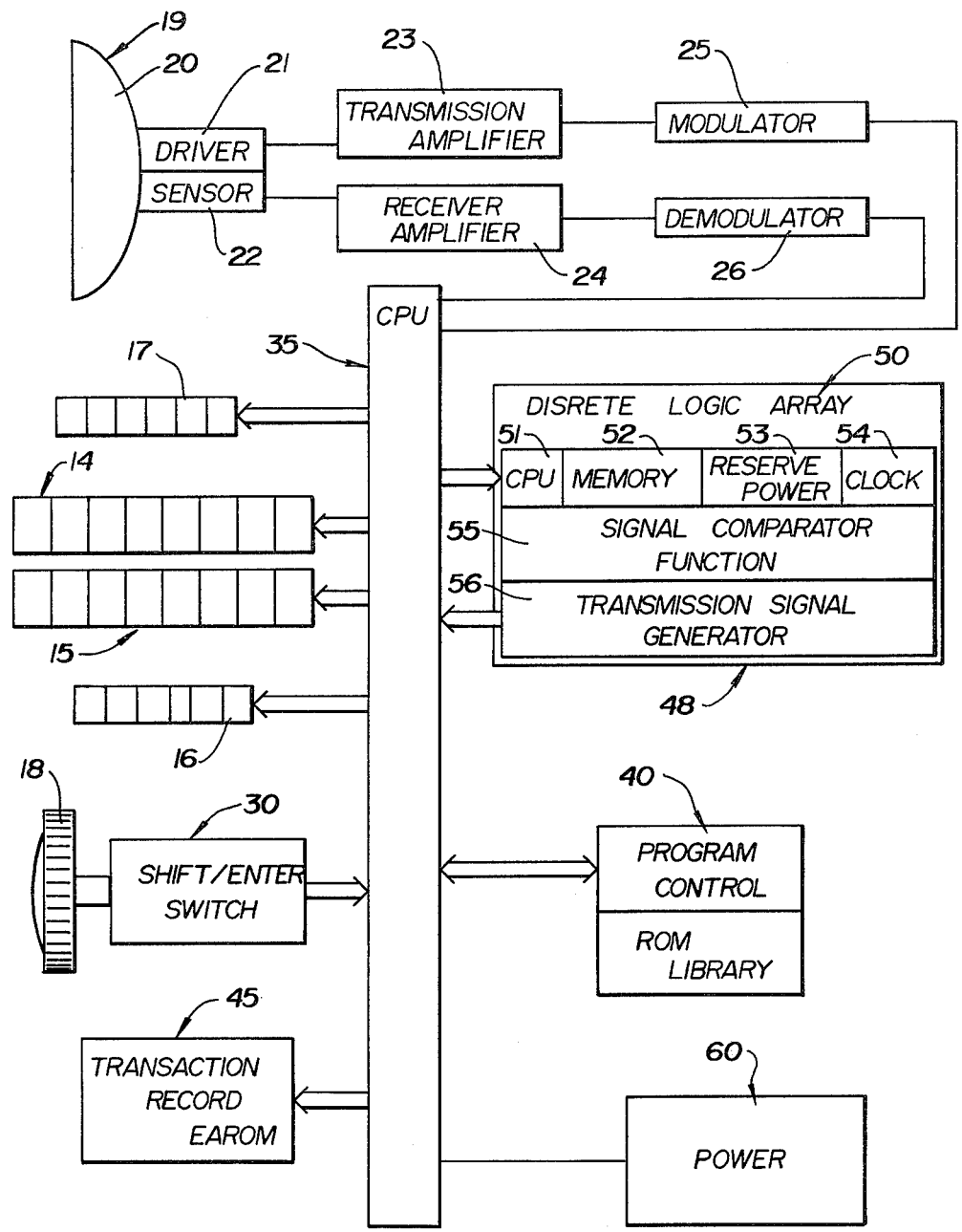
FIG. 4 is a block diagram of the electronic components of an apparatus unit of this invention.
Figure 5:
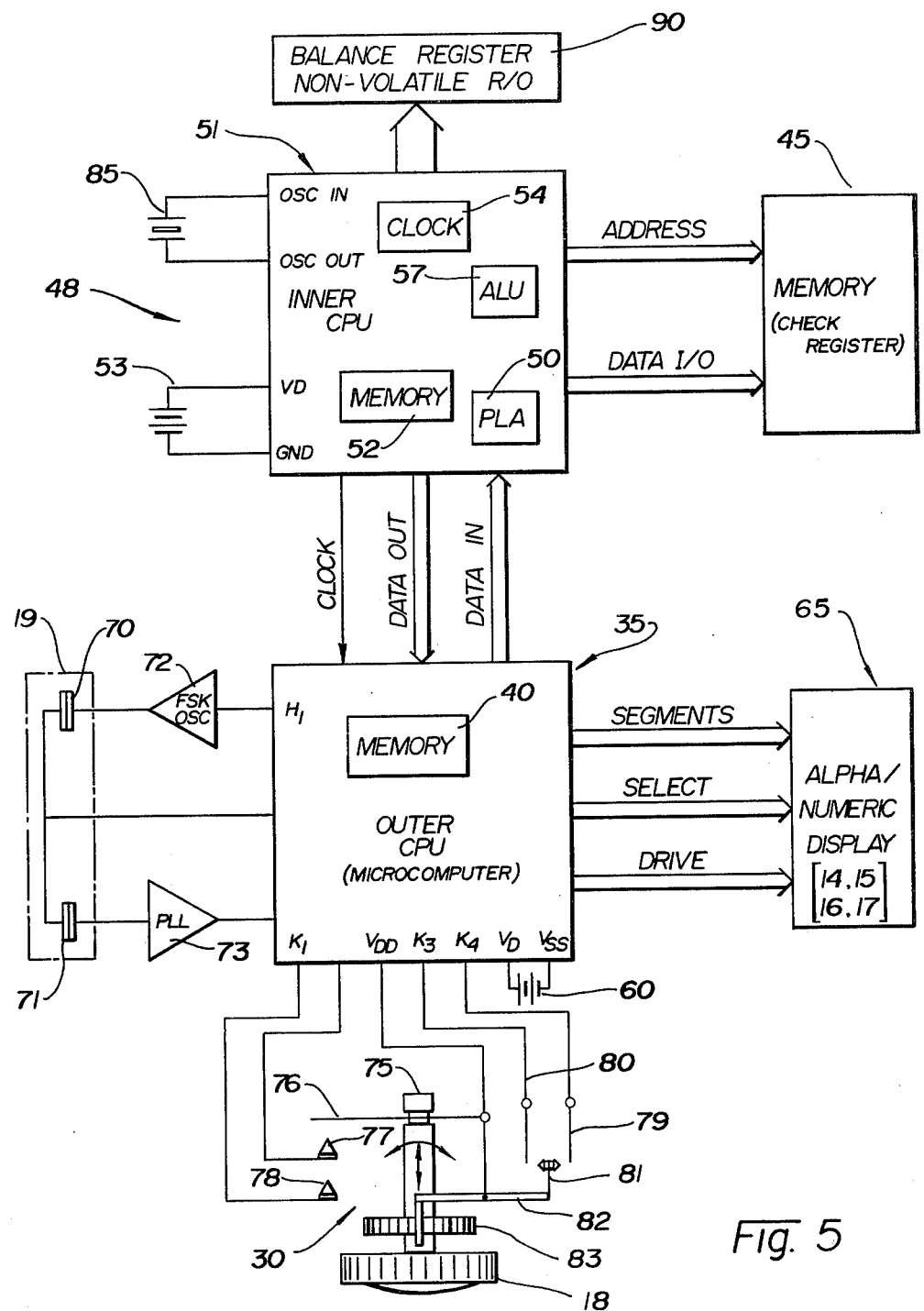
FIG. 5 is a block circuit diagram of an exemplary embodiment of an apparatus unit of this invention.

Referring specifically to FIG. 4, it will be noted that the system disclosed therein includes the accoustical transducer element 19 having a coupling diaphragm 20 which is mechanically coupled to a driving unit 21 and a sensing unit 22. The driving unit is electrically coupled with a signal transmitting amplifier 23 and is operable to effect conversion of the electrical signal for producing mechanical displacement of the diaphragm 20. Similarly the sensing unit 22 which is responsive to mechanical displacement of the diaphragm 20 to form an electrical signal that is an input to a receiver amplifier 24. As previously indicated, the coupling diaphragm 20 is supported in operative relationship to the exterior case of the housing 11 to effectively emit or receive accoustical radiation. The specific frequency range of operation of the unit is selected to have an adequate range to cover a frequency spectrum as necessary to effect the signal transmissions. Preferably this frequency range would be within a spectrum wherein little interference would be expected from environmental conditions customarily encountered during the course of operation and functioning of the inventive apparatus. Ultrasonic accoustical radiation may be selected as the desired operational frequency spectrum to achieve this objective.

A specific operating frequency would be selected as the desired carrier frequency for the transmission and receiving modes of operation. The selected frequency would optimally be that capable of being modulated with a signal that is adaptable to any specific type of modulation technique but taking into consideration the factor of compatability with respect to the accoustical transducer element 19. A particular coupling diaphragm 20 for such a device is normally of limited range capability and thus the entire apparatus must be designed to operate with the parameters of those mechanical elements.

In the case of the transmission mode, a modulator unit 25 is coupled with the transmission amplifier 23 and is provided with an input terminal for receiving an electrical signal. That signal through normal functioning of the modulator unit is then impressed on the carrier frequency and is thus capable of being transmitted through space to an appropriate receiving unit. Similarly, a demodulator unit 26 is coupled with the receiver amplifier 24 and is operable to obtain the modulation signal from the received composite signal and provide that modulating signal at an output terminal. This output signal is thus represented as an electrical signal capable of effecting operation of the interconnected components and units.

The plurality of display elements 14 and 15 are shown arranged in their respective linear array with eight distinct elements being included in each array. This number of elements is deemed sufficient to accommodate the basic operation in either a time-date mode of operation or in the information communication mode for financial transactions. This is clearly apparent by reference to FIG. 1 which shows that eight display units are all that are required to properly show a time as well as the respective date. Similarly for the basic design capacity in operating in the information communication mode eight display units are considered sufficient to effect the identification and the information display. Thus referring to FIGS. 2 and 3 it will be seen that the illustrative apparatus will have a monetary capacity of $999.99. This results from the fact that three dollar digits, a decimal and two cents digits are required for display of the proper amount with the addition of a minus or plus sign for providing the proper direction of transfer with respct to a particular unit. Obviously, greater numerical capacity may be built into a system through an increase in the number of display elements incorporated in a particular display array. It will be understood that with an increase or, if desired, a decrease in the display capacity and operating capacity, that the other portions of the system and controls would be appropriately modified.

Initiation of a function in the information communication mode is obtained by manual actuation of the hand set knob 18. This hand set knob is mechanically coupled with switching mechanisms that are capable of alternate selective operation to input a signal for either the identifier section or the information section of the signal and display functions. This mechanism is indicated at 30 and is designated in the diagram as a shift/enter switch device. Operation and functioning of such a switch 30 is well known in the art and is effective in inputing an electrical signal which, through appropriate shift registers, will effect energization of the respective display units 14 or 15 through an interfacing control processing unit 35 for the particular desired input signals. Concurrently with the energization of the display elements 14 and 15, there will be a digital input signal to a central processing unit 35 which is interfaced between the modulator and demodulator units 25 and 26 for the accoustical output and the other components of the systems apparatus. In particular the processing unit 35 is effective in performing the functions of applying the digitalized electrical signal to a program control 40. This program control 40 comprises a read only memory which is accessed by the input signal from the shift-/enter switch 30 and can thus provide the signal necessary for effecting operation of the display elements 14 and 15, in accordance with the selected input signal. Additionally, the program control 40 includes sections thereof which are accessed by an input signal received by the accoustical transducer element 19 from a second apparatus unit embodying this invention. Specific construction and operation of the program control 40 and its incorporated ROM are well known components in the art and further explanation or illustration thereof is not deemed necessary for an understanding of the operation and functioning of the apparatus and effecting the method of this invention.

The apparatus also includes storage means 45 for effecting a recording of all transactions or information communications. This storage means 45 comprises a memory unit which can receive inputs for storage as well as permit access for recall of previously stored information. Functioning of the storage means 45 in the recording of financial transactions is of particular importance as it maintains a continuous record of the numerical amounts that are transferred either to or from a particular apparatus and also provides information as to the other apparatus unit with which a specific unit had communicated. Preferably, the storage means 45 may be selectively accessed to provide a display of the numberical amount that has been cummulatively totaled through the operation of the apparatus. As indicated, the apparatus is normally designed to function with a maximum total amount capability to limit the use of the device as well as to limit the possible loss, even though losses are considered a minimal occurance. If the cummulative amount should exceed the units capacity, it is a conceivable practice that at least a portion of the stored total could be transferred to a unit functioning as a central collector or transfer unit such as a bank. A print-out operating mode is advantageously provided utilizing the units communication system for external coupling with other properly adapted ancilary devices (not shown or otherwise described) which have capability for print-out of a visible record of the information transmitted to it and for telephone coupling.

Control of the apparatus subsequent to the preliminary functions of input of an identifier and numerical amount is by means of microcomputer apparatus or switching logic processor circuit designated generally by the numeral 48 and is effected in the first instance by a time-control, discrete logic array circuit 50. This microcomputer apparatus 48 includes as subcomponents thereof forming a security block in the operational arrangement of the system in effecting a transaction, a processing unit 51, memory unit 52, reserve power source 53, and a clock unit 54.

Electrical power for energization of all components of a unit is normally provided by a suitable battery device 60 which has adequate capacity to also drive the time-date system that may be provided. The reserve power source 53 provides power to maintain operation of the logic circuit 50 in the event of failure of the primary battery 60 or removal of the logic circuit from the unit. It is the time-controlled logic circuit 50 which provides the security necessary to maintain the integrity of the apparatus in performance of financial transactions. Each of the apparatus units that are produced are thus caused to function on the time-control base which is functional to change its control function in the same amount of time as that which would be required to complete one transaction in the recording phase of operation. This feature thus assures that it is nearly impossible for any external signal source to interfere with the proper recording of the communicated information. This time-control logic circuit 50 is set at the time of manufacture or assembly of the unit and energization by connection with its reserve power source 53 whereby each unit is referenced to the same time base even though physical manufacture of any particular unit may be at a later time with respect to a base-time reference point. Each unit would be referenced to that same reference point and all units will be functional only in accordance with that same base-time for security purposes. Security of the unit may be further enhanced by coding techniques or other measures to the extent that may be deemed necessary. Also, physical security measures may be employed as to the circuitry unit itself that are designed to prevent disassembly of a unit for inspection and analysis. Appropriate encryption techniques and physical security methods are suggested in U.S. Pat. No. 3,806,874 issued to Kurt Ehrat, issued Apr. 23, 1974, titled IDENTIFICATION SYSTEM FOR INDIVIDUALS.

Each apparatus unit is provided with its own coded identification by permanently storing in a memory unit the first identification component of a signal string that is input thereinto and which is an integral function of the time-controlled logic circuit and is an identification for the particular individual who has that apparatus unit. This coded identification is represented as a digitalized electrical signal which is always thereafter automatically input to the processing unit for transmission and reception in coordinating operation of any two units which are intended to be conjunctively operated at any particular time for information transfer. This identification does not appear in a sending units display elements 14 for that particular apparatus unit, but it will be transmitted to the other unit forming the receiving function. Each time-controlled logic cir-50 is initially provided with its memory unit containing the coded identification for all other units as well as its own as it is necessary to effect an integral electronic comparison of generated and received signals in the course of any specific information transfer. For performance of this function the microcomputer apparatus 48 thus includes circuit means 55 having a signal comparator function. The microcomputer apparatus 48 also includes a signal generator 56 that is responsively functional to generate specified signals in accordance with the security control function. The particular signals that will be generated are discussed in the following descriptions of an exemplary operation.

Operation of the apparatus can be best understood with reference to a specific transaction effecting the transfer of a numerical amount from a first apparatus unit to a second unit. As previously indicated, this is diagrammatically illustrated in FIGS. 2 and 3 which illustrate displays associated with each of two respective apparatus units. In the illustrated example, it is shown that a transfer of $132.31 is being effected as from the first unit shown in FIG. 2 to the second unit shown in FIG. 3. Each unit may also be set to display an identifier for the owner of the other unit with that identifier conveniently comprising the other owners name.

The procedure followed by the operator of each respective unit is to set into that unit the essential elements of a specific transaction which has been predetermined by discussion between the two parties. In the illustrative example as shown in FIGS. 2 and 3, this transaction comprises transfer of a specific monetary amount from the first unit of FIG. 2 to the second unit of FIG. 3. Accordingly, the owner/operator of the first unit sets the display elements 14 to visually display the code identifier name of the owner of the second unit, sets the display elements 15 to visually display the monetary amount for that transaction and sets the mode indication windows 16 and 17. This mode of operation for the illustrative transaction is a payment to the second unit of the specified cash amount. Similarly, the owner/operator of the second unit sets the display elements 14 of the second unit to visually display the same monetary amount for that transaction and sets the mode indication windows 16 and 17 to show that it is to be a receipt of that amount from the first unit in a cash transaction. It will be appropriate to note at this point that it is essential for each party to accurately set their respective unit with the proper input for the selected transaction because failure to do so will result in the units refusing the transaction when the information transfer is initiated. This refusal of the transaction will be automatic through comparison of the signals transferred between the two units.

Assuming that each party has now set the illustrated inputs, and the two units are the correct units for the respective identifier codes, a transfer as between the two units is initiated by the second unit of FIG. 3 as it is the receiver. To effect initiation, the owner/operator manipulates the control knob 18 to an initiating position. When thus positioned, both units will be operative to transmit signals comprising four distinct elements of information which are as follows:

(1) coded identification of the unit;
(2) monetary amount to be transferred ($132.31);
(3) type of transaction (cash transfer to one unit);
(4) time correlation signal.

The signal comprising these information elements is a train of pulses in a preferred operating system and those pulse trains are serially transmitted by modulation of the basic carrier transmission frequency. This train of pulses is formed by the cooperative interaction of the several components through the central processing unit 35 with the units coded identification signal being obtained from its time-controlled logic circuit. The signals are simultaneously transmitted and received by each unit and information bits included in a signal pulse stream received by one apparatus unit must correctly interfit in a signal pulse stream generated by that unit and which constitutes its transmitted signal. Failure of received and transmitted signal streams to properly correlate will result in the units not proceeding with the transaction. Signals in the form of sets of bit combinations are generated by the units for transmission in pulse streams and it its these pulse stream bit combinations that are compared by logical processes of addition and substraction in the microcomputer by an arithmetic logic unit (ALU) common to standard practices in computer devices. The logic array 50 orders the sets of bit combinations in response to inputs and a code keystring relative to a clock string as is common to encryption techniques.

Transmission of a time correlation signal is essential to assure that each of the two units engaged in a transaction are operating on the exact same time. This is essential as the information transfer must occur during a same specific time frame with respect to each respective time-controlled logic circuit 50 to utilize the coding function that assures security of the system and changes as a function of time. It is not material that each unit be maintained in precise synchronization with real time but that the two units are caused to operate in synchronization is required to achieve an information transfer. Consequently, the units transmit a time signal which is received in a units logic circuit 50 and is functional to result in setting of the units clocks 54 in exact synchronization. Obviously, any subsequent transaction of either unit with another unit will result in synchronizing of the respective unit with that other unit which may be operating at a different real time. Inherent accuracy of the electronics is the major characteristic determining the necessity for a time correlation signal and, if the units could be constructed to operate without time error, there would be no need to provide time correlation. It will also be understood that a time synchronization will not be affected if the difference in time as between two apparatus units exceeds a predetermined time interval preferably of the order of a few seconds. This further enhances the security aspects of the apparatus.

Upon receipt of the second units signal in the first unit, and assuming completion of the time correlation function, the other elements of the received signal will then be compared to assure that each unit will be performing the proper operation for a specific predetermined transaction. Each unit was set with an input as to the other units identification and the coded signal generated by each units microcomputer 48 is compared with the other units coded identification which was received in the signal transmission received from the other unit. Similarly, the amount and transaction type components of the received signal are compared in the unit with the similar inputs set into the unit. In the event that any one of the three information components does not correctly compare, the logic circuits in the microcomputer detect the discrepancy and terminate the transaction. Upon termination, the first unit then functions to display what information was actually received and which information will then appear in the display elements 14 and 15 and mode indication windows 16 and 17. The parties may then either correct inputs or may conclude that other unit is not the proper desired unit and terminate all attempts to transfer information.

If the signal comparison in both units indicates that the units were set for the identically same transaction, the units function to then send a signal to the other unit that there is a correct comparison and that the other unit is to prepare to store the transaction information. Upon receipt of that signal by the units, they will then each function to send a signal back to the other unit that it is in condition to store and will store upon receipt of a confirmation or handshake sequence terminating the transaction. Receiving that signal, the units respond by generating a confirmation or handshake signal which is transmitted and concurrently operates to store the transaction information in its storage means 45 and then terminates operation as to that transaction. Although normal operation contemplates termination of a transaction being effected by generation and transmission of an interrupt signal, it will be noted here that a transaction transfer is preferably completed within the predetermined period of time on which the units operate to avoid complication that may result if the transfer extends into the next time unit since the coding function is designed to change for each successive period of time. Also, while a transaction is being completed, it will be understood that the apparatus units involved cannot be adjusted and appropriate input lockout means in incorporated.

Security of each information transfer is further enhanced by utilization of time line coding for the signal transmissions. Each of the units during the course of the initial transmissions is enabled to ascertain the time required for a signal to travel between the respective units by incorporation of appropriate timing functions. This transmission time information is then utilized in the units circuitry to prevent receipt of any signal except at the computed time when a signal is expected to be received from the other unit. The preferred operational technique is that each of the units function during the confirmation or handshake sequence to simultaneously store the information in each respective unit at the same computed instant in time. This technique is particularly effective in minimizing the chance that spurious signals which may be generated would have any effect on the function of either of the units participating in information transfer.

While a complete transaction record is stored in the respective storage means 45 of each unit, each unit also stores the cummulative total of the monetary amount in the memory unit 52 of its microcomputer 48 for utilization in determining capacity to accommodate subsequent transaction. Also, it is preferrable that the microcomputer be provided with computer circuits that store at least the monetary balance and which are not affected by a loss of electrical power. When required or desireable, the storage means 45 may be communicated with an external storage (not shown) to enable the apparatus unit to transfer out certain specified transactions or blocks of sequential transaction in order that a unit may be enabled to accommodate other transactions in its limited capacity storage means. Use of a properly adapted visible printout may be necessary or required as to those transferred transactions and can be readily accomplished utilizing a matched transceiver to communicate the data transfer in a printout mode of operation.

The preceding description was directed to a basic operating mode wherein each of the two apparatus units is operated by the respective operator to set in the same identical information that is to be communicated. Such a procedure is important for reasons of security and must be utilized in instances where the persons participating in the transaction are not positive of, or cannot otherwise ascertain identification of the other participant, such as in the case of a remote transaction. For example, it is essential in a transaction utilizing a telephone line coupling which precludes direct personal identification.

However, the dual and complete set in of information procedure as previously described may be omitted in instances where identification of each apparatus unit or party can be otherwise assured such as by personal recognition or identification. In such instances, it is only necessary for one of the apparatus units to be operated to initiate transfer of information by, for example, having the mode selector set to PAY TO or REC FR, set in the monetary amount and activate the signal sending function. This sends a signal sequence to the other apparatus unit which receives and functions to note that a portion of its information transmission signal sequence (the name) is represented by nulls, fails the transaction because neither unit had a complete signal string and is caused to function so as to provide and display the missing portions of the signal sequence from the received signals. At this point, the complete information sequence is displayed by both units. The displays will also be understood to include the indication in the display elements 14 of the indicator for the opposite unit in a manner similar to having the mode indicator windows 16 displaying the proper correlation as between PAY TO and REC FR. The operators of the units then check their respective displays and, if it is a correct display of the information agreed to be transferred, then each operates the knob 18 of their respective unit to initiate the signal sequence as previously described to effect the information store function as previously described. This type of operation may be a more widely utilized operation as it is contemplated the apparatus units would be most convenient in transactions where the two units would be located in close physical proximity thereby minimizing the likelihood of extraneous signal interferring with operation. Also, such operations are uniquely adapted to situations where one of the apparatus unit would be incorporated in a machine or other system and be operated automatically by and in controlling relationship to that machine or system.

Description of an exemplary function has been directed to a cash payment and receive transaction but it will be understood that the apparatus units may also be operated with credit type financial transactions. Credit-type transaction can be performed pursuant to input of an appropriate mode selection. Since the units are under time control, credit transactions may be readily accomplished with any selected time period. The logic circuit 50 can be constructed to incorporate functions that automatically relate a credit transaction to a selected time period and concurrently control the total monetary amount that is accumulated in a particular unit and function to delete the amount at a specific time from the memory storage means. Credit that may be received can be input into the systems to prevent any particular unit exceeding a maximum credit limit as well as controlling cash-type transactions. Initial utilization of an apparatus unit can be established by a direct purchase type transaction using a conventional money transfer.

The time-controlled logic circuit 50 includes its own clock 54 which can provide the time signal for utilization in a conventional clock display. While the logic circuit 50 has its own indepent power element 53, that power element is not utilized when the logic circuit is interconnected with the remainder of the systems components. When thus interconnected, the primary battery 60 provides all necessary power. The reserve electrical power element 53 is used to maintain the logic circuit 50 when it is disconnected from a complete unit system power source such as would be the case when it becomes necessary to replace the primary battery 60.

Having thus described the functional concepts and basic operational procedures of the invention with reference to the functional block diagram FIG. 4, reference may now be had to a more detailed block form circuit diagram of an exemplary embodiment of the apparatus unit and which is shown in FIG. 5. The units and components illustrated in FIG. 5 are designated by the same numeral where those components are related to the functionally similar components of FIG. 4. With this numbering arrangement, it will be readily seen that the functional operation of the circuit, as shown in FIG. 5, is the same as that described in FIG. 4 but in this instance particular components are specified to facilitate practice of the invention.

With this background referring specifically to FIG. 5, it will be seen that the apparatus unit includes two central processing units which are identified by the numerals 35 and 51 in the same manner as those units were designated in FIG. 4. Specific components for the central processing units or CPU's are known in the art as C-MOS-micro computers and are advantageously fabricated on single solid state integrated chips. Specific components that are adapted to the apparatus units are manufactured and sold by Sharp Electronics Corporation located at Paramus, N.J. with the CPU 35 being designated in that company's identification system as a type SM-5. The other CPU 51 is the Sharp Electronics unit designated as their type SM-4. Each of these CPU's includes, and incorporates therein, a memory unit block, which in the case of Item 35, is the program control memory element designated 40 in FIG. 4. Interconnected with the CPU 35 is the power source 60 which is indicated to be a battery and is of the wafer type for miniaturization of the apparatus.

It should be noted that an important object of providing dual CPU's 35 and 51 is for standardization of the inner CPU 51 which must be packaged to achieve physical and electronic security so that it may be adapted to many real world environments such as cash registers, gas pumps, product dispensing machines, etc. By flexible design and packaging, the outer CPU 35 is enabled to perform its main functions of conditioning and interfacing the inner CPU to various environments while the inner CPU 51 functions to secure the transactions and record balances with the greatest reliability that can be attained.

Also controlled and driven from the CPU 35 is a component designated as an alphanumeric display and is of the conventional type incorporating liquid crystal display and is indicated as including each of the separate display elements 14, 15, 16 and 17 of FIG. 4. This combined illustration of an appropriate display is designated by the numeral 65. Alphanumeric display units are commercially available and the indicated unit does not incorporate any structure or circuitry which is not within the state of the art. Driving of the alphanumeric display 65 is effected by the respective drive select and segment inputs from the CPU 35.

A transmission communicative link with another similar apparatus unit is achieved by the acoustical transducer element indicated generally at 19. This unit includes an output transducer which may be a piezoeletric crystal and a receiving unit transducer 71 which may be an electret type microphone device. Intercoupling of the output transducer 70 and receiving unit 71 with the CPU 35 is by respective components of a frequency shift keyed oscillator 72 in a transmitter section and a phase locked loop demodulator 73 in a receiver section. Exemplary commercially available products for both of these devices 72 and 73 are manufactured and available at integrated chips from Exar Integrated Systems, Inc. under their respective designations Exar Device Type 205, and Exar 567P11. These integrated circuit components perform the combined functions of modulation, amplification and driving as to the output transducer 70 and sensing, amplification and demodulation with respect to the receiving unit 71. These units are diagrammatically illustrated for indicating their interconnection with the CPU 35.

An exemplary embodiment of a shift-enter switch 30 is illustrated in greater detail in FIG. 5 along with its interconnection with the CPU 35. From a structural standpoint a suitable switch device includes an axial shaft 75 which is supported for both selected axial displacement and rotational displacement. The actuating knob 18 is secured to one end of this shaft 75. The interrupting of operations and mode entering functions are accomplished through the axial movement of this switch device. For this purpose the unit includes a movable contact 76 and two secondary contacts, 77 and 78. The primary contact 76 in interconnected with the CPU 35 at its contact point $V_{DD}$ with each of the secondary contacts 77 and 78 interconnected at the CPU 35 at the respective key input terminals. Functional operation of the illustrative switch is that when it is in a full-in, or initial position the secondary contacts, 77 and 78, are separated and there is no contact as between contacts 76 and 77. Outward movement of the shaft 75 from this first position, which position is a first signal position as far as the CPU 35 is concerned, results in engagement between contacts 76 and 77 to produce a second input signal to the CPU. Further outward axial displacement of the shaft 75 to a third position results in engagement also as between contact 77 and 78 and thus produces a third input signal to the CPU. As indicated, this axial movement of the switch shaft 75 thus enables one to control operations so as to set a display cursor at an appropriate column to be entered into, enter displayed characters into memory or to change mode function and activate function.

Input of signals for control of the alphanumeric display 65 are also accomplished by means of the switch device 30 as a result of rotational movement of the shaft 75. This is achieved through switch contacts which are indicated as 79 and 80 and an operating contact 81. The switch contacts, 79 and 80, are interconnected with input key terminals of the CPU 35 with the operating contact 81 also connected to terminal $V_{DD}$ of the CPU. Operation of the operating contact 81 is effected by means of an operating lever 82 which is mechanically coupled with an actuating gear 83. The gear 83 is secured on the shaft 75 and can be selectively rotated through manipulation of the operating knob 18. As the gear 83 is revolved, it will alternatingly cause the operating contact 81 to engage the contacts 79 or 80 to produce a sequential signal input with the contact engaged dependent on the direction of rotation. Thus rotation of the gear 83 will result in the formation of the appropriate signal depending on the extent and direction of rotation to input a signal for obtaining of a specific alpha and/or numeric character input. A sequential type of operation will thus enable one to input a sequence of numbers or alphabetic characters as is determined by the mode selection and operation. The input signal in the CPU 35 functions through the Read Only Memory 40 to result in the operation of the alphanumeric display 65. Many other functions can be input by this basic switch device 30 for operating the apparatus units in other modes such as Balance Retrieve for display of a units current balance and Print Check for effecting coupling with an anciliary unit to transfer and obtain a print-out for a visual record or for transfer of certain amounts to a larger capacity storage unit.

The CPU 35 is interconnected with the processing unit 51 which is disclosed as being of the designated manufacturers type and incorporates a memory block 52 as well as the clock 54. The reserve power device 53 is schematically illustrated as a battery and is interconnected to the CPU 51 at its indicated terminals of the exemplary device. The clock control circuitry 54 is directly controlled by a crystal oscillator 85 which is interconnected across the input-output oscillator terminals of the CPU 51. Also, incorporated in the CPU 51 is the logic array circuit 50 (PLA) that can be programmed and an Arithmetic Logic Unit (ALU) 57 as is common to standard practices in microcomputers of the exemplary type. The programmed logic array 50 orders sets of bit combinations in response to a signal input and the code key stream relative to the clock string signals.

With these circuit components, the transaction record memory 45 is coupled through the address and data I/O links with the CPU 51. An exemplary embodiment of such a memory unit is manufactured and sold by Sharp Electronic Corporation, their product identification type code LH5101H.

To assure retention of the balance register memory in the composite unit which is the microcomputer 48, a register memory unit 90 is included and coupled with the CPU 51. The functional objective of the register memory unit 90 is to assure that the cummulative information, such as total amounts, will be retained in the event that electrical power is disconnected or lost as to the remaining memory units and provides proof of possession. Components utilized for such purposes of a non-volatile memory are commercially available and identified as an E-cell. Such units, useful for this purpose, are manufactured by Plessuy Electro Products located in Los Angeles, Calif.

The CPU 51 operates in response to stored programs in the memory 52 to accomplish the following functions:

(A) Generate an encryption key relative to the bits of the clock 54;

(B) Encrypts the bit string input from the outer CPU 35 for comparison with a received signal string from another unit;

(C) Encrypts the send signal string which includes the units identification and the information to be transmitted;

(D) Computes time offset to accommodate differences between any two units;

(E) Determines whether the transaction is valid and, if valid, drives a non-volatile array balance register memory unit 90 to store;

(F) Provides a logging function of records of the transaction in the memory 45; and (G) May be utilized in controlling credit transactions.

It is interfaced with the outer CPU 35 to communicate all of the foregoing functions for application by the outer CPU to input, edit, display and to communicate with another unit.

The integrated circuit chips and devices or components comprising the microcomputer 48 and particularly the CPU 51 are intended to be packaged such that the minimum possible external contacts are required and the package is made as secure as possible from intrusion without totally destroying the programming. Properties of encoding computer programs are discussed in U.S. Pat. No. 3,806,874 as it relates to similar requirements in identification systems for individuals. Also, a brief description is included in that patent as to methods to prevent intrusion into Large Scale Integrated (LSI) chip packages. Specific methods of encryption are not disclosed as the particular user of this invention disclosure would use its own particular techniques adapted to its particular apparatus.

Summarizing the specific illustrative embodiment and components as shown in FIG. 5, it will be seen that those components do function and perform the operational objectives of the functionally described unit of FIG. 4. These components are specifically adaptable to construction of an operational apparatus unit of this invention and effect the inputting of data information, processing of that information, and display along with transmission as between any two respective apparatus units.

It will be readily apparent from the foregoing description of this exemplary embodiment of this invention and its method of operation that a particularly unique and useful information communication apparatus and method is provided. This invention enables the convenient transfer and recording of information by electronic means whereby individuals may perform monetary transfers and financial credit operations without the necessity of other entities such as banking institutions. The apparatus provides the necessary security and can be adapted to longrange communications. Initial input of any monetary amount into a specific apparatus unit would be in accordance with the selected management technique developed by the entity or controlling organization having management responsibility for the apparatus units.

Having thus described this invention, what is claimed is:

1. An information communicating apparatus unit comprising input means selectively operable to generate electrical signals related to a plurality of respective information elements including a fungible information element that are desired to be input into the apparatus for communication with another compatible apparatus unit display means having a plurality of display elements which are selectively energizaeable in response to input of said information element signals to provide a verifiable display of such information elements, interface processing circuit means coupled in circuit with said input means for receiving the generated electrical signals and assemble those signals to form a correspondence check signal and coupled in circuit with said display means for effecting a display of said generated signals and being operable to form a correspondence check transmission signal, signal transmission means coupled with said interface processing circuit means and operable to effect transmission of said correspondence check transmission signal to another of said apparatus units located in relatively remote relationship and to effect receipt of a correspondence check transmission signal from said other apparatus unit, and switching logic processor circuit means coupled with said interface processing circuit means for receiving said correspondence check signal formed by signal said interface processing circuit means and and a correspondence check signal received from said other apparatus unit via said interface processing circuit means, said logic circuit means including identifier signal generation means selectively operable upon input of said correspondence check signals to form a security identifier signal for the apparatus unit and to include such security identifier signal in the correspondence check signal, signal encoding/decoding circuit means referenced to a time control base and operable to change the security identifier signal for each of successive time base periods, comparison circuit means for effecting a comparison of the correspondence check signals input thereto by said switching logic processor circuit means coupled with said interface processing circuit means for receiving said correspondence check signal formed by said interface processing circuit means and a correspondence check signal received from said other apparatus unit via said interface processing circuit means, said logic processor circuit means including identifier signal generation circuit means selectively operable upon input of a correspondence check signal from said interface processing circuit means to form a security identifier signal for the apparatus unit and to include such security identifier signal in the correspondence check signal, signal encoding/decoding circuit means referenced to a correspondence signal time base compatible with all apparatus units and operable to sequentially and non-repetitively change the security identifier signal component of the correspondence check signal for each of successive correspondence time periods over the life of the unit, comparison circuit means for effecting a comparison of the correspondence check signals input thereto by said interface processing circuit means and from said other apparatus unit and for forming a compared signal as to each of respective compare or non-compare conditions, second signal generation circuit means interconnected with said comparison circuit means and responsive to said compared signal for forming a transmittable store signal and causing transmission to said other apparatus unit by said interface processing circuit means in the event of a correct comparison, and to terminate the operation in the absence of comparison for assuring that only reciprocal fungible signal components are honored in each apparatus unit, and proof of possession register memory circuit means interconnected therewith to respond to said store signal and to register at least the fungible component of the correspondence check signal.

2. An apparatus unit according to claim 1 wherein said register memory circuit means of said processing circuit means for electronically recording at least the fungible information element components is of a nonvolatile type.

3. An apparatus unit according to claim 2 wherein said register memory circuit means includes a second memory circuit for receiving and storing correspondence check signals including fungible components thereof and can be selectively accessed to retrieve previously stored information.

4. An apparatus unit according to claim 1 wherein said signal transmission means comprises apparatus for effecting transmittal of said transmission signals as radiation as between the apparatus unit and one said other apparatus unit.

5. An apparatus according to claim 1 wherein said logic circuit means includes timing means.

6. An apparatus according to claim 1 which includes operating mode selector circuit means connected with said interface processing circuit means and which is responsive to a selected input to cause operation of an apparatus unit in alternate ones of at least two modes as between any two apparatus units placed in communicating relationship.

7. The method of communicating information including fungible elements as between apparatus units comprising the steps of generating an electrical communication transmission signal in a first apparatus unit, said transmission signal having a correspondence check signal including an electrical identifier signal component unique to such first apparatus unit, generating an electrical communication transmission signal in a second apparatus unit, said second unit transmission signal having a correspondence check signal including an electrical identifier signal component unique to such first apparatus unit, transmitting said second apparatus unit transmission signal to the first apparatus unit and reception thereat, generating an electrical identifier signal in the first apparatus unit that is the identifier signal for the second apparatus unit, comparing the received and generated correspondence check signals and second apparatus unit identifier signals in the first apparatus unit, transmitting said first apparatus unit transmission signal to the second apparatus unit and reception thereat upon determination of a correct comparison of signals by the first apparatus unit, generating an electrical identifier signal in the second apparatus unit that is the identifier signal for the first apparatus unit, encoding the respective identifier signal of each of the apparatus units for each successive time period of each unit in accordance with a non-repetitive coding sequentially changing for each successive time period, effecting simultaneous communication of correspondence check signals between two apparatus units in a single time period, comparing the received and generated correspondence check signals in the first and second apparatus units, and storing said transmission signals in each of the first and second apparatus units upon determination of a correct comparison of signals by both apparatus units.

8. The method of claim 7 including the further steps of generating an incorrect comparison signal in the apparatus unit, failing the transaction upon determination of such comparison, and displaying the received transmission for edit or approval.

9. The method of claim 8 including the further steps of transmitting a communication transmission storing signal from each of the apparatus units to the other and thereafter ceasing transmission.

10. The method of claim 8 including the further step of determining signal transmission time by each unit with respect to the other unit and utilizing such time determination to restrict each unit to thereafter receiving a transmission signal from the other unit at a predetermined time.

11. The method of claim 10 including the further step of each unit generating an informatin storage signal and transmitting that signal to the other at a time in the signal transmitting sequence so that it will be received thereat at the predetermined time.

* * * * *

UNITED STATES PATENT OFFICE
CERTIFICATE OF CORRECTION

Patent No. 4,320,387     Dated March 16, 1982

Inventor(s) William S. Powell

It is certified that error appears in the above-identified patent and that said Letters Patent are hereby corrected as shown below:

Column 17, lines 51 through 68, inclusive, cancel beginning with "switching logic processor circuit" to and including "signals input thereto by said" in line 68.

Column 19, line 10, cancel "first" and substitute therefor --second--.

Signed and Sealed this

Fifth Day of October 1982

[SEAL]

Attest:

Attesting Officer

GERALD J. MOSSINGHOFF

Commissioner of Patents and Trademarks